United States Patent [19]

Taskier

[11] 4,298,666
[45] Nov. 3, 1981

[54] COATED OPEN-CELLED MICROPOROUS MEMBRANES

[75] Inventor: Henry T. Taskier, Fanwood, N.J.

[73] Assignee: Celanese Corporation, New York, N.Y.

[21] Appl. No.: 125,195

[22] Filed: Feb. 27, 1980

[51] Int. Cl.³ .......................................... H01M 2/14
[52] U.S. Cl. .................................. 429/206; 429/229; 429/248; 429/250; 429/251; 429/144
[58] Field of Search ............... 429/143, 144, 145, 248, 429/250, 254, 206, 216, 247; 204/295; 427/173, 250; 428/290, 296, 301

[56] References Cited

U.S. PATENT DOCUMENTS

| | | | |
|---|---|---|---|
| 3,235,473 | 2/1966 | Le Duc | 204/30 |
| 3,472,700 | 10/1969 | Kollman et al. | 429/250 |
| 3,539,396 | 11/1970 | Wagner | 429/28 |
| 3,793,060 | 2/1974 | Weininger et al. | 429/212 X |
| 3,970,472 | 7/1976 | Steffensen | 429/206 |
| 4,192,908 | 3/1980 | Himy et al. | 429/53 |
| 4,217,404 | 8/1980 | Verzwyvelt | 429/250 X |

Primary Examiner—Anthony Skapars
Attorney, Agent, or Firm—Robert J. Blanke

[57] ABSTRACT

The present invention provides a microporous membrane having deposited on at least one surface thereof a porous, uniform coating of a low hydrogen over-potential material. The coated microporous membrane is particularly suited for use as a battery separator in a rechargeable zinc electrode containing battery, which is resistant to penetration by zinc dendrites and is capable of increasing the uniformity of current density upon recharging of the battery.

A battery employing said coated microporous membrane as a battery separator as well as a process for using said coated microporous membrane is also provided.

19 Claims, 2 Drawing Figures

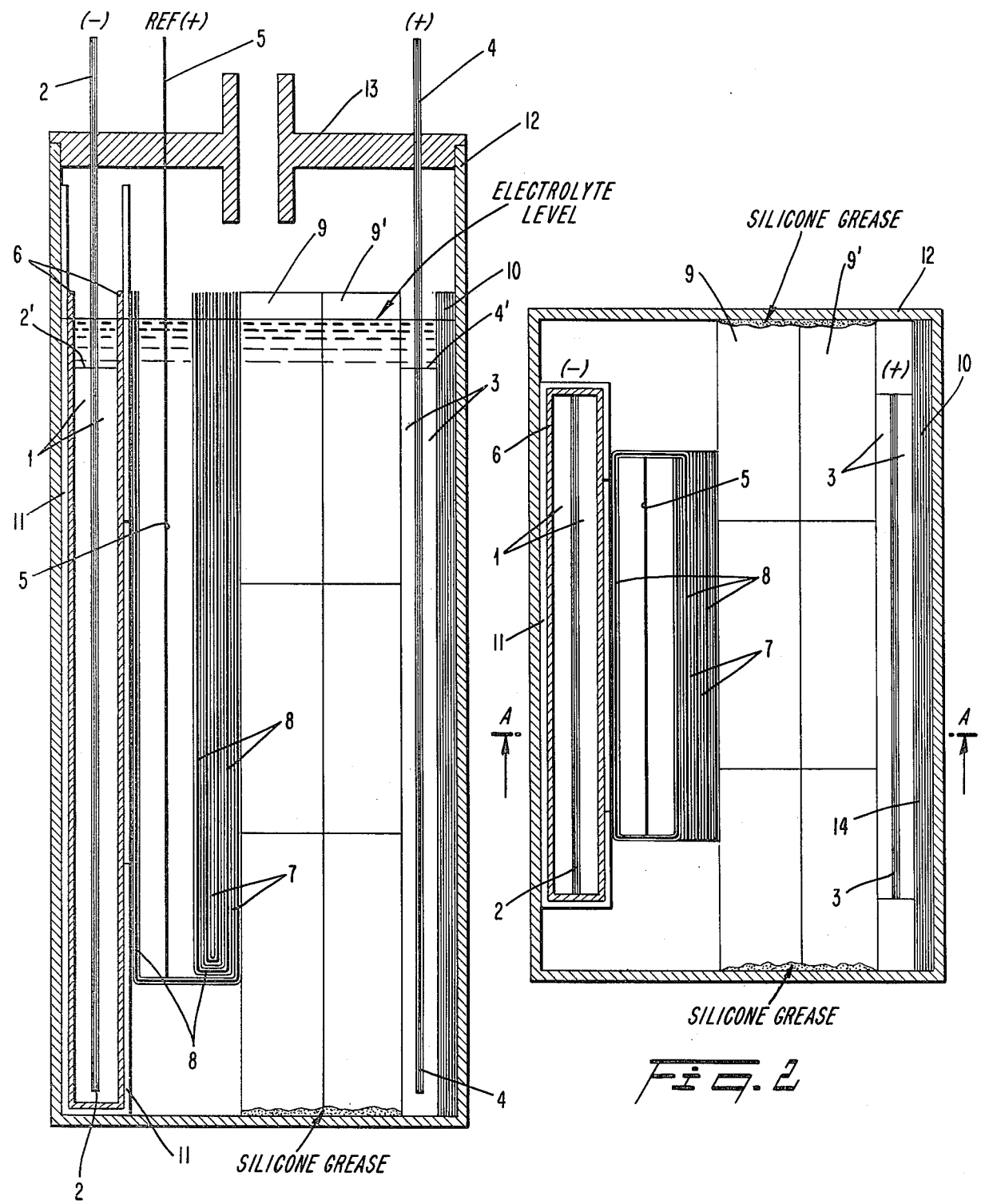

COATED OPEN-CELLED MICROPOROUS MEMBRANES

BACKGROUND OF THE INVENTION

Electric vehicle (EV) development programs are underway in most of the highly industrialized countries. In the U.S., the Department of Energy is managing a $160 million program under the Electric Hybrid Vehicle Research, Development, and the Demonstration Act, passed by Congress in 1976. It is expected that when electric vehicles find widespread use, they will greatly reduce dependence on petroleum and will also have a desirable impact on environmental pollution in urban areas.

The current models of electric vehicles, using lead-acid batteries, offer limited performance that barely qualifies them for short-trip local driving. They can go only about 40 miles before they have to stop for hours-long charging. Speeds are limited to no more than 40–55 mph, and when they are operated at that top speed the batteries are drained even more rapidly. Poor acceleration is another drawback. These limited performance characteristics are further reduced in cold weather. Finally, the batteries available have limited use life with deteriorating performance on repeated charge-discharge cycling. Thus, the key to the future success of electric vehicles is a better battery, e.g., one that weights less, is more compact, stores more energy, releases the energy more rapidly, can be recharged more rapidly, lasts longer, and costs less initially and over its entire life cycle.

A wide variety of batteries have been suggested for vehicle applications, and all have problems to overcome before they will be practical. The leading battery contenders for use in electric vehicles remain the ones that have looked most promising for the past several years, i.e., lead-acid, nickel-iron and nickel-zinc. Of these, the nickel-zinc battery has the best initial energy-to-weight and power-to-weight characteristics. The nickel-zinc battery however exhibits poor cycle lift, i.e., the number of charge and discharge cycles which a battery can undergo before it no longer is capable of performing its intended function.

The poor cycle life of nickel-zinc batteries is especially troublesome when they undergo deep discharges. This problem is associated with any secondary battery which employs zinc as the anode and an alkaline electrolyte, because of the high solubility of the oxidation products thereof, namely, $ZnO$ or $Zn(OH)_2$.

The short cycle life of batteries employing zinc anodes is attributed to premature cell failures which can be characterized as being catastrophic or gradual. Catastrophic cell failures are believed to be due to internal shorting of the cell by the growth of zinc dendrites which form a bridge between the electrodes.

For example, the nickel-zinc battery is based on the following half-cell reactions:

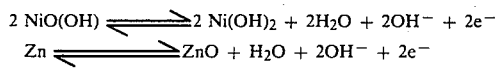

$$2\ NiO(OH) \rightleftharpoons 2\ Ni(OH)_2 + 2H_2O + 2OH^- + 2e^-$$
$$Zn \rightleftharpoons ZnO + H_2O + 2OH^- + 2e^-$$

The reversible reactions are written so that the discharge cycle reads from left to right. The zinc half-cell reaction as written above, however, is an oversimplification since the oxidized form of zinc exists as a mixture of $ZnO$, $Zn(OH)_2$ and $Zn(OH)_4^=$. The zincate ion ($Zn(OH)_4^=$) is soluble and contributes to the complexity of cell performance.

The nickel-zinc cell discharge reaction supplies a flow of electrons through the external (workload) circuit. To maintain material and electrical balances, however, water and hydroxide ions must flow freely in the electrolyte between the electrodes. In order for the battery to operate effectively, a direct electronic path in the internal circuit between the nickel and zinc must be prevented and yet there must be a path between the electrodes through which the ions can travel which are necessary for the electrode reactions. These two goals are achieved by the use of a separator which is inserted between the electrodes of the battery.

When a battery employing a zinc anode is charged, the above-described reaction reverses and zinc is formed. Ideally, the zinc which is formed is redeposited on the zinc anode. However, some of the zinc which is produced in the charging sequence gives rise to formation of zinc dendrites which tend to bridge out from the zinc anode and connect up with the cathode. Even when a battery separator is inserted between the electrodes the zinc dendrites can actually penetrate the separator over a number of charging cycles leading to catastrophic cell failure.

The gradual, but unacceptable rapid loss of cell energy capacity occurs more frequently with repeated deep discharge cycling wherein the active mass of zinc anode is almost completely depleted. This gradual loss of energy capacity is related to pore plugging and other deterioration in the separator, and to shape change in the zinc electrode. The shape change of the electrode results from the fact that the zinc is not redeposited during charging at the location where it has been oxidized during discharging by accumulates instead in that part of the cell where the current density is greatest causing densification of the electrode.

Many attempts have been made to prevent the formation of dendritic zinc and shape change or to avoid the damaging consequences thereof. Thus, some success has been achieved with a pulsating charging current, electrolyte additives, electrolyte circulation, and the use of special separators.

More specifically, a great deal of attention is being given to the design of battery separators.

As may be gleaned from the above discussion, separator performance is one of the keys to the durability of zinc electrode containing batteries. The separator's ability to control the flow of electolyte components plays a limiting role in determining maximum power to weight ratio, in maintaining a uniform zinc electrode shape, and in retarding the diffusion of zincate to the cathode. The initial electrolyte flow properties should not be altered by the accumulation of $ZnO$ within the pores of the separator. Moreover, the separator is expected to resist the penetration of zinc dendrites which lead to electrical shorts and the separtor material must survive the harsh oxidative alkaline environment of the electrolyte in the vicinity of the cathode for the target life of the cell.

Battery separators employed in the past can be segregated into two basic categories, namely, those which operate by diffusion and those which operate by mass transport.

For example, cellulosic films (e.g., cellophane, sausage casing) have been the most common separators for the nickel-zinc cell. The pore size in cellophane is within the order of molecular dimensions such that transport of water and ions between the electrode compartments is by molecular diffusion. Because of the diffusive transport mechanism, there is an inherent limitation in charging and discharging rates. During charging, local depletions of hydroxide ion occur, leading to electro-osmotic pumping and convective flow of electrolyte, which cause erosion and lateral shape changes on the zinc electrodes.

The most limiting shortcoming of cellulosic separators, however, is their degradation in the cell environment. Oxidation of the cellulose within the cell during discharge results in the formation of $CO_2$ as one of the products of oxidation, which leads to electrolyte carbonation, lowering of the cell voltage and loss of positive electrode capacity. Eventually the physical failure of the degraded cellulosic separator terminates the cell's life.

Various approaches used to cope with the degradation problem all involve compromises of cell characteristics and/or cost. For example, electrolyte concentrations above 40% KOH are used with cellulosic separators to reduce the degradation rate. However, at 31% KOH, where the cell's internal resistance would be the lowest, the degradation rate of cellophane is unacceptable.

Multiple layers of cellulose separators permit additional cycles, but at increased separator cost and weight gain, and an increase in internal resistance. The same holds true for those which are fabricated with a "protective" layer of a more resistant microporous film shielding the cellophane from the oxygen evolution.

Modified cellulosics have been reported to achieve important effects on cell performance and separator durability. None is offered commercially however. For example, cellophane has been modified by treatment with titanium and cerium. However, the use of titanium obviously increases the cost of the separator to an unacceptable degree.

Microporous polypropylene which has a pore size in the order of 200 Å is an example of a separator wherein the electrolyte balance is maintained by mass transport thereof through the pores. Because of the ease of electrolyte transport, concentration gradients do not build up during high rate charge and discharge, and convective flows and electro-osmotic pumping effects are reduced. Furthermore, polypropylene is chemically inert in the cell environment, thus permitting operation at 31% KOH for minimum cell internal resistance. Such mass transport films are not without their own disadvantages, however. For example, the pore structure of certain microporous films permits the transfer of zincate to the nickel compartment. After repeated cycling, zinc and zinc oxide accumulate in the separator. More importantly, however, such microporous films are easily penetrated by zinc dendrites which leads to catastrophic failure of the cell.

One approach towards preventing dendrite shorting of nickel-zinc cells is to provide an auxiliary electrode as illustrated in U.S. Pat. No. 4,039,729. This patent describes a rechargeable galvanic cell wherein an auxiliary electrode is present in the cell and segregated from the positive and/or negative electrode by at least one microporous separator. The auxiliary electrode consists of a porous, electrically conductive material made preferably of copper, iron, or nickel in the configuration of a "netting", "perforated plate", or "screen plate" of a thickness of 0.05 to 0.15 mm. The large thickness of the auxiliary electrode is disadvantageous because it increases the internal resistance of the cell, and reduces the power to weight characteristics of the battery, e.g., the number of cells per unit weight which can be packed into the battery is reduced. Furthermore, the nature of the configuration of the auxiliary electrode requires the use of excessive amounts of nickel which increases the cost of the battery. The use of auxiliary electrodes is also disadvantageous in that present battery manufacturing techniques would have to be significantly modified to provide for placement of an auxiliary electrode between each anode-cathode pair. This does not appear to be a practical or economical solution of the above-described problems.

U.S. Pat. No. 3,970,472 is directed to a rechargeable zinc anode battery which reduces dendrite growth by the use of a dendrite barrier. The barrier comprises an open weave cloth substrate of, for example, random polypropylene fibers, upon which is deposited a porous metal, such as nickel. This dendrite barrier is separated from the zinc anode by consecutive layers of a microporous film, and an electrolyte absorbent layer. The barrier is separated from the cathode by an integral and distinct cellulosic film. The collective battery separator therefore comprises 4 layers and permits electrolyte transport by a diffusion mechanism which increases the internal resistance of the cell. When the nickel is applied to the open weave using an acrylic plastic carrier, the cloth becomes permeated throughout its structure with nickel. This increases the consumption of nickel substantially. Since the effect exerted by the nickel impregnated cloth is to catalyze the oxidation of the zinc dendrites to form a soluble zinc species therefrom, and this effect is a surface phenomenon, i.e., it occurs immediately upon contact of the zinc dendrite with the nickel. The impregnation of the entire cloth with nickel is a waste of nickel. However, due to the open weave nature of the barrier cloth it is not possible to deposit nickel only on the surface thereof in a manner sufficient to assure that the zinc dendrites would not find a path through its interior.

U.S. Pat. No. 3,539,396 discloses a battery separator wherein a layer of sintered metal such as nickel is sandwiched between two membranes of the type made from such materials are cellophane, alumina-silicate ceramic, polyvinyl alcohol and the like. The metal, e.g., nickel, layer is sintered to form an integral and distinct structure in which the metal particles are interconnected to form pores. Alternatively, the nickel particles can be incorporated into a binder such as polypropylene or polyphenylene oxide and in some instances the binder may be interlocked with the metal particles by heat curing. In this instance, the permeability of the barrier is primarily due to the pores of the sintered nickel. The solid polymer binder sintered nickel layer is relatively thick, e.g., 0.001 to 0.020 inch, and therefore inhibits mass transport and increases the internal resistance of the cell as well as leading to electrolytic unbalance.

U.S. Pat. No. 3,539,374 (see U.S. Pat. No. 3,666,517 for the process of making) is directed to a metal-coated plastic substrate such as microporous film which is hydrophobic. The metal coating of the film, however, is applied to the non-porous precursor of the microporous film which is subsequently stretched to develop the open-celled structure therein. More importantly, however, the thickness of the metal film is disclosed as ranging from 0.2 to 20 microns (2,000 to 200,000 Å) and no utility of the same as a battery separator is disclosed.

Consequently, while such thick metal coatings are useful for providing thermal insulation they would increase the electrical resistance of the film to unacceptable levels.

U.S. Pat. No. 3,793,060 is directed to porous metal coated ultrafine porous polymer articles which can be employed as an electrode or current collector. The pore size of said porous articles is disclosed as having an average diameter of from 40 to 120 Å. Such metal coated porous articles are not disclosed as having utility as a battery separator. Consequently, this patent expresses no concern for the criticality of the coating thickness or uniformity and the properties controlled thereby and indeed discloses a thickness of 2000 Å and higher. The selection of the metals employed for the coating also reflects a lack of intent that the coated articles be employed as battery separators.

The search has therefore continued for a battery separator which results in improved performance of a zinc electrode containing secondary battery. The present invention has been developed in response to this search.

It is therefore an object of the present invention to provide a microporous membrane having a uniform deposit of a metal having a low hydrogen overvoltage on the surface thereof which is capable of use as a battery separator and is resistant to zinc dendrite penetration.

It is a further object of the present invention to provide a battery separator capable of improving the life cycle performance of a zinc electrode containing secondary battery.

It is still another object of the present invention to provide a battery separator which exhibits improved resistance to internal shorting when employed in a zinc electrode containing secondary battery.

It is another object of the present invention to provide a battery separator which will minimize shape change and densification of a zinc electode when employed in a secondary battery.

It is a further object of the present invention to provide a battery separator which will continue to perform its intended function when employed in a zinc electrode containing battery which is subjected to numerous deep discharge cycles, high charging rates, and accidental overcharges.

It is still another object of the present invention to provide a battery separator which will maintain or improve overall zinc electrode containing battery cell performance parameters including ease of manufacturability, energy density, power density and peak power in a cost efficient manner.

It is a further object of the present invention to provide a zinc electrode containing rechargeable battery which employs a battery separator which achieves the above described objects for a battery separator.

It is still another object of the present invention to provide a process for reducing the penetration of a battery separator by zinc dendrites.

These and other objects and features of the invention will become apparent from the claims and from the following description when read in conjunction with the accompanying drawings.

SUMMARY OF THE INVENTION

In one aspect of the present invention there is provided at least one open-celled microporous membrane having deposited on at least one surface thereof a uniform porous coating comprising a low hydrogen overpotential material said microporous membrane prior to deposition of said coating being characterized by an electrical resistance when rendered hydrophilic of not greater than about 50 milliohms-in$^2$, a reduced bulk density as compared to the corresponding substrate membrane having no open-celled structure, a surface area of at least 10 sq. m/gm, and an average pore size from about 200 to about 10,000 Å, said porous coating covering an area which is substantially coextensive with the surface of the microporous substrate membrane on which it is deposited and being characterized by a uniform thickness of at least 50 Å yet insufficient to cause the electrical resistance of said coated microporous membrane to exceed about 75 milliohms-in$^2$ when rendered hydrophilic.

In another aspect of the present invention there is provided a rechargeable zinc electrode containing battery which employs the above described coated microporous membrane as a separator.

In a further aspect of the present invention there is provided a process for reducing the penetration of a battery separator which is disposed between a zinc anode and a cathode which constitute the electrodes of at least one rechargeable electrolytic cell employing an alkaline electrolyte and for increasing the equalization of current density during recharging thereof which comprises employing as the battery separator the above described coated open-celled microporous membrane.

BRIEF DESCRIPTION OF THE DRAWINGS

FIG. 1 is a schematic presentation of a side cross-sectional view along Line A of FIG. 2 which depicts a zinc penetration test cell that is employed to determine the zinc penetration factors of the coated microporous membranes described herein.

FIG. 2 is a schematic presentation of a top view of the same test cell of FIG. 1.

DESCRIPTION OF THE PREFERRED EMBODIMENTS

In its broadest aspect the present invention is directed to a microporous membrane which has deposited thereon a uniform coating of a low hydrogen overpotential barrier material, said membrane preferably being characterized by an ability to exhibit at a low electrical resistance, resistance to oxidation, mechanical properties sufficient to withstand the stress of being incorporated as a battery separator into a battery, chemical properties sufficient to maintain its structural integrity in an alkaline battery environment, and the ability to permit the free flow of electrolyte ions through the same by a mass transport mechanism.

The preferred form of the membrane is an open-celled microporous film.

Porous or cellular films can be classified into two general types: one type in which the pores are not interconnected, i.e., a close-celled film, and the second type in which the pores are essentially interconnected through tortuous paths which extend from one exterior surface or surface region to another, i.e., an open-celled film. The porous films employed as the membrane in the present invention are of the latter type.

Further, the pores of the porous films employable as the membrane substrates of the present invention are microscopic, i.e., the details of their pore configuration or arrangement are discernible only by microscopic examination. In fact, the open-celled pores in the films generally are smaller than those which can be measured using an ordinary light microscope, because the wave length of visible light, which is about 5,000 Å (an Angstrom is one ten-billionth of a meter), is longer than the longest planar or surface dimension of the open cell or pore. The microporous film substrates of the present invention may be identified, however, by using electron microscopy techniques which are capable of solving details of pore structure below 5,000 Å.

The microporous film substrates of the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949).

Porous films have been produced which possess a microporous, open-celled structure, and which are also characterized by a reduced bulk density. Films possessing this microporous structure are described, for example, in U.S. Pat. No. 3,426,754 which patent is assigned to the assignee of the present invention and herein incorporated by reference. The preferred method of preparation described therein involves drawing or stretching at ambient temperatures, i.e., "cold drawing", a crystalline, elastic precursor film in an amount of about 10 to 300% of its original length, with subsequent stabilization by heat setting of the drawn film under a tension such that the film is not free to shrink or can shrink only to a limited extent. Other methods of preparing microporous film are exemplified by U.S. Pat. Nos. 3,558,764; 3,843,762; 3,920,785; British Pat. Nos. 1,180,066 and 1,198,695 which are all herein incorporated by reference.

While all of the above-listed patents describe processes for preparing microporous films, the preferred microporous films are provided in accordance with the processes described in U.S. Pat. No. 3,801,404 which defines a method herein referred to as the "dry stretch" method and U.S. Pat. No. 3,839,516 which defines a method for preparing microporous films herein referred to as the "solvent stretch" method, both of which are herein incorporated by reference. Each of these patents discloses preferred alternative routes for obtaining a microporous film by manipulating a precursor film in accordance with specifically defined process steps.

The preferred precursor films which may be utilized to prepare microporous films in accordance with the "dry stretch" and "solvent stretch" methods are specifically detailed in each of the above respective patents. Thus, the "dry stretch" method utilizes a non-porous crystalline, elastic, polymer film having an elastic recovery at zero recovery time (hereinafter defined) when subjected to a standard strain (extension) of 50% at 25° C. and 65 percent relative humidity of at least 40%, preferably at least about 50% and most preferably at least about 80%.

Elastic recovery as used herein is a measure of the ability of a structure or shaped article such as a film to return to its original size after being stretched, and may be calculated as follows:

$$\text{Elastic Recovery } (ER) \% = \frac{\text{length when stretched} - \text{length after stretching}}{\text{length added when stretched}} \times 100$$

Although a standard strain of 50% is used to identify the elastic properties of the starting films, such strain is merely exemplary. In general, such starting films will have elastic recoveries higher at strains less than 50%, and somewhat lower at strains substantially higher than 50%, as compared to their elastic recovery at a 50% strain.

These starting elastic films will also have a percent crystallinity of at least 20%, preferably at least 30%, and most preferably at least 50%, e.g., about 50 to 90%, or more. Percent crystallinity is determined by the X-ray method described by R. G. Quynn et al in the *Journal of Applied Polymer Science*, Vol. 2, No. 5, pp. 166–173 (1959). For a detailed discussion of crystallinity and its significance in polymers, see *Polymers and Resins*, Golding (D. Van Nostrand, 1959).

Other elastic films considered suitable for preparing precursor films utilized in the "dry stretch" method are described in British Pat. No. 1,052,550, published Dec. 21, 1966.

The precursor elastic film utilized in the preparation of the microporous films by the "dry stretch" process route should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperature, are particular consequences of entropy-elasticity. The elasticity of the precursor elastic films utilized herein, on the other hand, is of a different nature. In qualitative thermodynamic experiments with these elastic precursor films, increasing stress with decreasing temperature (negative temperature coefficient) may be interpreted to mean that the elasticity of these materials is not governed by entropy effects but dependent upon an energy term. More significantly, the "dry stretch" precursor elastic films have been found to retain their stretch properties at temperatures where normal entropy-elasticity could no longer be operative. Thus, the stretch mechanism of the "dry stretch" precursor elastic films is thought to be based on energy-elasticity relationships, and these elastic films may then be referred to as "nonclassical" elastomers.

Alternatively, the "solvent stretch" method utilizes a precursor film which must contain at least two components, e.g., an amorphous component and a crystalline component. Thus, crystalline materials, which are by nature two components, work well with the process. The degree of crystallinity of the precursor film must therefore be at least 30%, preferably at least 40% and most preferably at least 50% by volume of the precursor film.

The polymers, i.e., synthetic resinous material from which the precursor films utilized in either process in accordance with the present invention include the olefin polymers, such as polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1.

For example, in general when propylene homopolymers are contemplated for use in the "dry stretch" method, an isotactic polypropylene having a percent crystallinity as indicated above, a weight average molecular weight ranging from about 100,000 to 750,000 (e.g., about 200,000 to 500,000) and a melt index (ASTM-D-1238-57T, Part 9, page 38) from about 0.1 to about 75, (e.g., from 0.5 to 30), can be employed so as to give a final film product having the requisite physical properties.

It is to be understood that the terms "olefinic polymer" and "olefin polymer" are used interchangeably and are intended to describe a polymer prepared by polymerizing olefin monomers through their unsaturation.

Preferred polymers for use in the "solvent stretch" method are those polymers utilized in accordance with the invention described in U.S. Patent Application Ser. No. 44,805, filed on June 2, 1979, by John W. Soehngen and assigned to the Assignee of the present invention, entitled "Improved Solvent Stretch Process for Preparing Microporous Films from Precursor Films of Controlled Crystalline Structure" the disclosure of which is herein incorporated by reference. Thus, a polyethylene homopolymer having a density of from about 0.960 to about 0.965 gm/cc, a high melt index of not less than about 3 and preferably from about 3 to about 20 and a broad molecular weight distribution ratio ($\overline{M}_w/\overline{M}_n$) of not less than about 3.8 and preferably from about 3.8 to about 13 is preferred in preparing a microporous film by the "solvent stretch" method. Moreover, nucleating agents may be incorporated into the polymer employed to prepare the precursor film as described in the incorporated Soehngen application in which case the polymers having a melt index as low as 0.3 may be employed.

The types of apparatus suitable for forming the precursor films are well known in the art.

For example, a conventional film extruder equipped with a shallow channel metering screw and a coat hanger die is satisfactory. Generally, the resin is introduced into a hopper of the extruder which contains a screw and a jacket fitted with heating elements. The resin is melted and transferred by the screw to the die from which it is extruded through a slit in the form of a film from which it is drawn by a take-up or casting roll. More than one take-up roll in various combinations or stages may be used. The die opening or slit width may be in the range, for example, of about 10 to 200 mils.

Using this type of apparatus, film may be extruded at a drawdown ratio of about 5:1 to 200:1, preferably 10:1 to 50:1.

The terms "drawdown ratio" or more simply, "draw ratio", as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C., preferably 200° C. to 240° C. Polyethylene may be extruded at a melt temperature of about 175° to 225° C.

When the precursor film is to be utilized in accordance with the "dry stretch" method, the extrusion operation is preferably carried out with rapid cooling and rapid drawdown in order to obtain maximum elasticity. This may be accomplished by having the take-up roll relatively close to the extrusion slit, e.g., within two inches and, preferably, within one inch. An "air knife" operating at temperatures between, for example, 0° C. and 40° C., may be employed within one inch of the slit to quench, i.e., quickly cool and solidify, the film. The take-up roll may be rotated, for example, at a speed of 10 to 1000 ft/min, preferably 50 to 500 ft/min.

When the precursor film is to be utilized in accordance with the "solvent stretch" method, the extrusion operation is preferably carried out with slow cooling, in order to minimize stress and any associated orientation which might result from a fast quench to obtain maximum crystallinity but yet fast enough to avoid developing large spherulites. This may be accomplished by controlling the distance of the chill roll take-up from the extrusion slit.

While the above description has been directed to slit die extrusion methods, an alternative method of forming the precursor films contemplated in this invention is the blown film extrusion method wherein a hopper and an extruder are employed which are substantially the same as in the slit extruder described above.

From the extruder, the melt enters a die from which it is extruded through a circular slit to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide different cooling rates. Means such as a cooling mandrel may be used to cool the interior of the tubular film. After a distance during which the film is allowed to completely cool and harden, it is wound up on a take-up roll.

Using the blown film method, the drawdown ratio is preferably 5:1 to 100:1, the slit opening 10 to 200 mils, preferably 40 to 100 mils, the $D_2/D_1$ ratio, for example, 1.0 to 4.0 and preferably about 1.0 to 2.5, and the take-up speed, for example, 30 to 700 ft/min. The melt temperature may be within the ranges given previously for slit die extrusion.

The extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene, the preferred annealing temperature is about 100° C. to 155° C.

An exemplary method of carrying out the annealing is by placing the extruded film in a tensioned or tensionless state in an oven at the desired temperature in which case the residence time is preferably in the range of about 30 seconds to 1 hour.

In the preferred embodiments, the resulting partly-crystalline precursor film is preferably subjected to one of the two alternative procedures described above to obtain a normally hydrophobic microporous film which may be utilized as the membrane substrate in the present invention.

The first preferred procedure as disclosed in U.S. Pat. No. 3,801,404, herein referred to as the "dry stretch" method, includes the steps of cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat-setting the resulting porous film under tension, i.e., at substantially constant length, to impart stability to the film.

The term "cold stretching" as used herein is defined as stretching or drawing a film to greater than its original length and at a stretching temperature, i.e., the temperature of the film being stretched, less than the temperature at which melting begins when the film is uniformly heated from a temperature of 25° C. and at a rate of 20° C. per minute. The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morophology of the film. For example, polypropylene elastic film may be cold stretched at a temperature below about 120° C. preferably between about 10° C. and 70° C. and conveniently at ambient temperature, e.g., 25° C. The cold stretched polypropylene film may then be hot stretched at a temperature above about 120° C. and below the fusion temperature, and preferably between about 130° C. and 150° C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5% of its cold stretched length, before being hot stretched.

The sum total amount of stretching in the above two steps may be in the range of about 10 to 300% and preferably about 50 to 150%, based on the initial length of the elastic film. Further, the ratio of the amount of hot stretching to the sum total amount of stretching or drawing may be from above about 0.10:1 to below 0.99:1, preferably from about 0.50:1 to 0.97:1, and most preferably from about 0.50:1 to 0.95:1. This relationship between the "cold" and "hot" stretching is referred to herein as the "extension ratio" (percent "hot" extension to the percent "total" extension).

In any stretching operation where heat must be supplied the film may be heated by moving rolls which may in turn be heated by an electrical resistance method, by passage over a heated plate, through a heated liquid, a heated gas, or the like.

After the above-described two stage or two step stretching, the stretched film is heat set. This heat treatment may be carried out at a temperature in the range from about 125° C. up to less than the fusion temperature, and preferably about 130° to 160° C. for polypropylene; from about 75° C. up to less than fusion temperature, and preferably about 115° C. to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15% of its stretched length, but not so great a tension as to stretch the film more than an additional 15%. Preferably, the tension is such that substantially no shrinkage or stretching occurs, e.g., less than 5% change in stretched length.

The period of heat treatment which is preferably carried out sequentially with and after the drawing operation, should not be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

A second preferred alternative procedure for converting the precursor film to a microporous film as described in U.S. Pat. No. 3,839,516 and herein referred to as the "solvent stretch" method includes the basic steps of (1) contacting the precursor film having at least two components (e.g., an amorphous component and a crystalline component), one of which is lesser than in volume than all the other components, with a swelling agent for sufficient time to permit adsorption of the swelling agent into the film; (2) stretching the film in at least one direction while in contact with swelling agent; and (3) maintaining the film in its stretched state during removal of the swelling agent. Optionally, the film may be stabilized by heat-setting under tension or by ionizing radiation.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

General classes of swelling agents from which one appropriate for the particular polymeric film may be chosen are lower aliphatic ketones such as acetone, methylethylketone, cyclohexanone; lower aliphatic acid esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, benzene, xylene, tetraline, decaline, etc.; nitrogen-containing organic compounds such as pyridine, formamide, dimethylformamide, etc.; ethers such as methyl ether, ethyl ether, dioxane, etc. A mixture of two or more of these organic solvents may also be used.

It is preferred that the swelling agents be a compound composed of carbon hydrogen, oxygen, nitrogen, halogen, sulfur and contain up to about 20 carbon atoms, preferably up to about 10 carbon atoms.

The "solvent stretching" step may be conducted at a temperature in the range of from above the freezing point of the swelling agent, to a point below the temperature at which the polymer dissolves (i.e., ambient temperature to about 50° C.).

The precursor film employed in the "solvent stretch" process may range from about 0.5 to about 5 mils, or even thicker, subject to the electrical resistance requirements discussed herein.

In a preferred embodiment the precursor film is biaxially stretched in accordance with the procedure disclosed in U.S. Patent Application Ser. No. 44,801, filed on June 1, 1979, entitled "Improved Solvent Stretching Process for Preparing Microporous Films" and assigned to the assignee of the present invention, the disclosure of which is herein incorporated by reference. This process identifies preferred stretching conditions in a uniaxial direction which lead to improved permeability of the uniaxially stretched microporous film. The uniaxially stretched microporous film can then be stretched in a transverse direction to improve the permeability even further. Thus, it is preferred that the precursor film be "solvent stretched" in a uniaxial direction not greater than about 350%, and most preferably 300% greater than its original length. Typically, additional stretching in the same direction after the solvent removal is not employed.

The optional stabilizing step may be either a heat-setting step or a cross-linking step. This heat treatment may be carried out at a temperature in the range from about 125° C. up to less than the fusion temperature and preferably about 130° to 150° C. for polypropylene; from about 75° C. up to less than fusion temperature, and preferably about 115° to 130° C. for polyethylene and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent of its stretched length. Preferably, the tension is such that substantially no shrinkage or stretching occurs, e.g., less than 5% change in stretched length.

The period of heat treatment which is preferably carried out sequentially with and after the "solvent stretching" operation, shouldn't be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

When the precursor film is biaxially stretched the stabilizing step should be conducted after transverse stretching and not before.

While the present disclosure is directed primarily to the aforesaid olefin polymers in connection with their use in the "dry stretch" or "solvent stretch" procedures, the invention also contemplates the use of high molecular weight acetal, e.g., oxymethylene, polymers to prepare precursor films which can be rendered microporous as described herein. While both acetal homopolymers and copolymers are contemplated, the preferred acetal polymer for purposes of polymer stability is a "random" oxymethylene copolymer, which contains recurring oxymethylene, i.e., —$CH_2$—O—, units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and where a major amount of the —OR— units exist as single units attached to oxymethylene groups on each side. Examples of preferred polymers include copolymers of trioxane and cyclic ethers, containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150° C. and a number average molecular weight of at least 10,000. For a more detailed discussion of acetal and oxymethylene polymers, see *Formaldehyde,* Walter, pp. 175-191, (Reinhold 1964).

Other relatively crystalline polymers, from which precursor films can be derived to which the "dry stretch" or solvent stretch methods may be applied, are the polyalkylene sulfides such as polymethylene sulfide and polyethylene sulfide, the polyarylene oxides such as polyphenylene oxide, the polyamides such as polyhexamethylene adipamide (nylon 660 and polycaprolactam (nylon 6), all of which are well known in the art and need not be described further herein for the sake of brevity.

The microporous films produced by the above described methods and which can be employed as substrates in the present invention, in a tensionless state, have a lowered bulk density compared with the density of corresponding polymeric materials having no open-celled structure, e.g., those from which it is formed. Thus, the films have a bulk density no greater than about 95% and preferably 20 to 40% of the precursor film. Stated another way, the bulk density is reduced by at least 5% and preferably 60 to 80%. For polyethylene, the reduction is 30 to 80%, preferably 60 to 80%. The bulk density is about 20 to 40% of the starting material, the porosity has been increased by 60 to 80% because of the pores or holes.

When the microporous film is prepared by the "dry stretch" or "solvent stretch" methods the final crystallinity of the microporous film is preferably at least 30 percent, more preferably at least 65%, and more suitably about 70 to 85%, as determined by the X-ray method described by R. G. Quynn et al in the *Journal of Applied Polymer Science,* Vol. 2, No. 5, pp. 166–173. For a detailed discussion of crystallinity and its significance in polymers, see *Polymers and Resins,* Golding (S. Van Nostrant, 1959).

The microporous films which can be employed as substrates in the present invention and which can be produced by the aforenoted methods may also have an average pore size of from about 200 to about 10,000 Å, typically from about 200 to about 5000 Å, and more typically about 200 to about 400 Å. These values can be determined by mercury porosimetry as described in an article by R. G. Quynn et al, on pages 21-34 of *Textile Research Journal,* January, 1963 or by the use of electron microscopy as described in Geil's *Polymer Single*

*Crystals,* p. 69 (Interscience 1963). When an electron micrograph is employed pore length and width measurements can be obtained by simply utilizing a ruler to directly measure the length and width of the pores on an electron micrograph taken usually at 2,000 to 50,000 magnification. Generally, the pore length values obtainable by electron microscopy are approximately equal to the pore size values obtained by mercury porosimetry.

The microporous films which can be employed as substrates in the present invention will exhibit a surface area within certain predictable limits when prepared by either the "solvent stretch" method or the "dry stretch" method. Typically such microporous films will be found to have a surface area of at least 10 sq.m/gm and preferably in the range of about 15 to about 50 sq.m/gm. For films formed from polyethylene, the surface area generally ranges from about 10 to about 25 sq.m/gm. and preferably about 20 sq.m/gm, and for polypropylene from about 20 to about 50 sq.m/gm.

Surface area may be determined from nitrogen or krypton gas adsorption isotherms using a method and apparatus described in U.S. Pat. No. 3,262,319. The surface area obtained by this method is usually expressed as square meters per gram.

In order to facilitate comparison of various materials, this value can be multiplied by the bulk density of the material in grams per cc. resulting in a surface area expressed as square meters per cc.

A further characteristic of the microporous membranes which can be utilized in the instant invention is its porosity.

The porosity of the microporous film membranes suitable for use in the present invention may be defined as a percent ratio of the total volume occupied by the void space of a standard sample of microporous film to the bulk volume of the same sample which is the sum of the void space volume and the volume occupied by the solid material of the film itself. The % porosity is determined by measuring the thickness, length and width of a microporous film sample to determine the film's bulk volume. The film sample is then weighed and the density of the film is determined. The density of the polymer resin used to prepare the film is then determined. The % porosity is then calculated from the equation:

$$\% \text{ Porosity} = \left(1 - \frac{\text{density of film sample}}{\text{density of resin}}\right) \times 100$$

The porosity of the microporous film membranes suitable for use in the present invention and obtainable from the aforenoted methods may vary from about 30 to about 85%, preferably from about 30 to about 45%, and most preferably from about 35 to about 45%.

The above described microporous polymeric films which can be employed as substrate membranes in the instant invention have a thickness of from about 0.7 (0.001 inch) to about 8 mils, preferably from about 0.7 to about 4 mils; and most preferably from about 0.7 to about 2 mils.

In order to be useful as a battery separator the non-coated microporous substrate membrane must be capable of exhibiting an electrical resistance of not greater than about 50 milliohms-square inch (milliohms-in$^2$), preferably not greater than about 20 milliohms-in$^2$, and most preferably not greater than about 5 milliohms-in$^2$ when rendered hydrophilic as described herein.

Electrical resistance as defined herein is a measure of the ability of the microporous membrane to conduct ions. Consequently, as a general rule the higher the electrical resistance of the microporous film the less effective it will be as a battery separator.

Electrical resistance (direct current method) of a microporous film as defined herein and employed in the claims is determined by soaking a sample thereof having a known surface area (e.g., 0.2 sq. inches) in about a 40% by weight, solution of KOH in water for 24 hours. The resulting sample is then disposed between working cadium electrodes (i.e., anode and a cathode) immersed in an electrolyte of a 40%, by weight, solution of KOH in water and a direct current of known amperage (e.g., 40 milliamperes) is passed through the cell between the electrodes. The potential drop across the film (E) is measured with an electrometer. The potential drop across the cell without the microporous film disposed therein (E) is also determined using the same current.

The electrical resistance of the microporous film is then determined using the equation:

$$E.R. = \frac{(E' - E)A}{I}$$

where A is the surface area of the exposed film in square inches, I is the current across the cell in milliamperes, E.R. is the electrical resistance of the microporous film in milliohms-square inch, and E' and E are as described.

In order for the above described microporous films to exhibit the requisite electrical resistance when performing the above described test it is generally necessary to render the same hydrophilic, e.g., with a suitable surfactant, to allow the aqueous solutions of KOH to penetrate the entire pore structure. The type of surfactant and manner of its application is discussed hereinafter.

The above described microporous films prepared in accordance the aforenoted "dry stretch" and "solvent stretch" methods will exhibit the above described requisite electrical resistance, operate via a mass transport mechanism when employed as a battery separator, are resistant to oxidation and in general possess all of the above mentioned properties which are deemed necessary to render them commercially suitable for use as microporous substrates in the present invention.

However, it is contemplated that any microporous substrate which possesses the aforenoted pore structure, electrical resistance, and mass transport properties, regardless of how it is made or the material from which it is derived may be employed as the substrate for the barrier material coating.

The pore structure of the substrate membrane determines the nature and properties of the metal coating when it is deposited thereon.

If the pore size is too small the metal coating will plug the pores and render it incapable of use as a battery separator. If the pore size is too large the metal coating will penetrate the inner portions thereof to the extent that excessive amounts of the metal will be consumed in the coating, the electrical resistance of the coated substrate will increase and the uniformity of the metal coating will be reduced.

It has been found that substrate membranes characterized by the above described pore structure can have deposited thereon a uniform extremely thin coating which is sufficiently porous to yield only a slight reduction in the electrical resistance when compared to the uncoated membrane and yet the nature of the porous metal coating is such that it will substantially increase the resistance of the microporous substrate to penetration by zinc dendrites therethrough as described hereinafter.

It is a further advantage that the metal coated substrate membrane is capable of reducing the aforenoted shape change of the zinc electrode. By way of explanation and without wishing to be bound by any particular theory it is believed that the metal coated substrate membrane, when employed as a battery separator, increases the uniformity of the current density at the zinc anode during recharging. The increase in uniformity of the current density is believed to be attributable to the fact that the metal coating does not impede the mass transport properties of the microporous substrate generally, and, because the metal coating is of uniform thickness, it does not alter the uniformity of the mass transport properties at different points on the surface thereof.

A further advantage of the equalization of current density is the fact that it reduces the tendency of zinc dendrites to form in the first place. Zinc dendrites will form when the current density during charging exceeds a certain threshold limit. Below this limit zinc deposits occur in the form of mossy zinc rather than dendritic zinc. Since mossy zinc is not believed to be responsible for piercing the separator membrane it is more readily possible to generate the formation of mossy zinc in favor of zinc dendrites without the danger that some localized spot on the separator membrane will exhibit a localized current density which is above the threshold for zinc dendrite formation.

The capacity for metal coated barrier separators employed in the past to achieve uniform current densities has been limited by both the non-uniformity of the mass transport properties of the substrate materials themselves as well as the non-uniformity of the coatings applied thereon.

The present invention not only provides a substrate with uniform and highly advantageous mass transport properties but because of the uniformity of its overall pore structure it permits the development of uniform coatings deposited thereon.

While the preferred configuration of the substrate membrane is a film, preferably an embossed film for reasons described hereinafter, the substrate membrane may possess other configurations which render it suitable for its intended end use, such as a battery separator, which is within the skill in the art including tubes, bags, and the like.

Alternatively, in a preferred embodiment, the microporous substrate membrane may comprise a microporous film, such as that prepared by the aforenoted "dry stretch" or "solvent stretch" methods which have a non-woven substantially continuous randomly arranged filamentary material, particularly polyolefins such as polypropylene of varying crystallinity, and varying diameter, which extend generally parallel to the plane of the film, thermally bonded to itself at randomly located filament crossover points and to the film at randomly located contact points between the filamentary material and the film. Such laminates are preferably prepared by spray spinning and spun bonding techniques. Other suitable filamentary materials in addition to polyolefins include cellulose acetate, polyamides, polyacetals, polyalkylene sulfides, and polyarylene oxides. The resulting thermally bonded filamentary layer-microporous film laminate is then embossed i.e., pressed between moving embossing rolls or rollers heated to elevated temperatures of about 100° to about 150° C. in a conventional calendering machine. The embossing of the laminate imparts raised or projected design ridges in relief on the surface thereof which have the unexpected advantageous effect of providing gas channels for release of the hydrogen generated by the dissolution of zinc dendrites when the laminate is coated with a metal as described herein and employed as a battery separator. The embossed laminate also has the additional unexpected advantage of providing a buttress effect for the metal coating when applied to the fiber containing side thereof which reduces or prevents flaking of the metal coating.

The thickness of the embossed non-woven filamentary layer typically will vary from about 1 to about 10 mils, preferably from about 1 to about 7 mils, and most preferably from about 1 to about 5 mils. The filamentary layer is deposited to cover an area which is coextensive with the surface of the substrate membrane on which it is placed.

The filamentary material which is spray spun, and spun-bonded, on the surface of the microporous film typically has a denier per filament (dpf) of from about 0.5 to about 5, preferably from about 1 to about 4 dpf, and most preferably from about 2 to about 3.5 dpf. The thickness of the laminate will generally be from about 2 to about 8 mils (e.g., 3 mils).

Alternatively, an integral non-woven web can be first prepared, for example, by a spray spinning technique, and this web then laminated to the microporous membrane by embossing as described in U.S. Pat. No. 3,679,540, the disclosure of which is herein incorporated by reference.

The description and preparation of the microporous film non-woven filamentary laminate by spray spinning which can be embossed is provided in U.S. Pat. No. 3,932,682 the disclosure of which is herein incorporated by reference. A more detailed description of the preferred spray spinning technique used to prepare said laminates or non-woven webs is provided in U.S. Pat. No. 3,543,332 the disclosure of which is also herein incorporated by reference.

The barrier materials which are employed to coat the microporous substrate membrane may be any low hydrogen over-potential material or alloy such as nickel, iron, cobalt, platinum, palladium, indium, chromium, manganese, carbon, titanium, etc., of which nickel and iron are preferred.

The mechanism by which the coated microporous substrate membrane operates consists of the active local action between dendritic zinc and the low hydrogen over-potential cathodic sites of the barrier material. When the zinc dendrites come in contact with the barrier materials, they in effect function as a local anode and are dissolved to form zincate ions by the local cell action in accordance with the following reaction:

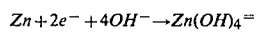

$$Zn + 2e^- + 4OH^- \rightarrow Zn(OH)_4^=$$

The active local cell reaction is completed by the hydrolysis of water at the cathodic barrier material sites in accordance with the following reaction:

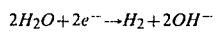

$$2H_2O + 2e^- \rightarrow H_2 + 2OH^-$$

Thus, even if the zinc dendrites penetrate the microporous substrate they are prevented from causing internal shorting of the cell since they are dissolved before they have a chance to complete a bridge to the cathode.

The method which has been found to lead to the greatest uniformity of the deposited coating of the barrier material is vacuum deposition.

There are three basic vacuum deposition methods available for depositing metal films on a substrate namely evaporation, sputtering, and ion plating.

The evaporation process involves simply heating the barrier material in a vacuum, causing it to vaporize and re-condense on substrates, thereby forming a film.

In the sputtering process, a gas plasma discharge, typically argon, is set up between two electrodes. These are the cathode, which is fabricated of the barrier material to be deposited, and the anode, upon which the microporous substrate membrane is placed. Positively charged gas ions are attracted towards and accelerated into the cathode. Their impact knocks out atoms of the cathode material which then condense on the substrates, forming a film.

Ion-plating is a combination of the evaporation and sputtering processes. As in sputtering, a gas plasma discharge is set up between a cathode and anode. Here, however, the cathode is the substrate and the anode is the source of material being deposited. The substrates are sputter-etch cleaned by the ions from the discharge both prior to and during deposition of the film, which occurs as a result of the anode material being heated to evaporate material onto the cathode. As a result of evaporation of the anode, the condensation rate on the cathode (the substrate) exceeds the sputter removal rate at the cathode, and the film grows. It is to be understood that substrate temperatures during ion-plating should not be above the softening point thereof.

Evaporation sources in common usage are of two types, namely those which employ resistance heated filaments or boats, and those which employ electron beam guns for single or multiple crucibles. Heated filaments or boats typically would not be employed to achieve vacuum deposition of the barrier material on the microporous substrate membrane since the same would be heated above its softening point and the microporosity therein would be destroyed. When electron beam sources are employed, however, the crucible, which contains the material to be deposited, is maintained at a relatively cool temperature throughout the deposition and there is less danger that the microporous substrate membrane will be heated to deleterious temperatures.

Various types of sputtering equipment and configurations are commercially available such as the dc diode, the filament supported discharge, the rf coil supported discharge, and the rf diode to name a few. The preferred sputtering equipment is the S-Gun TM available from Varian Associates which employs an rf diode. The choice of operating parameters such as voltage, current, pressure and power, and procedures such as pumpdown, back-fill, clean against shutter, power ramp up and the like are all within the skill in the art when guided by the requirements of the coating as described herein. The advantage of the sputtering method lies in the fact that substrate bombardment and heating is negligible.

The uniformity of the barrier material coating is a particularly important property which is controlled in depositing the barrier material on the microporous substrate.

The uniformity of the coating is characterized in terms of the increase in the variability of the air flow through the coated substrate membrane compared to the variability of the air flow of the substrate membrane alone. The air flow through the substrate is determined in accordance with the Gurley test ASTM D-726-B. In accordance with this procedure the substrate film having an effective area of one square inch is mounted in a standard Gurley densometer. The film is subject to a standard differential pressure (the pressure drop across the film) of 12.2 inches of water. The time in seconds required to pass 10 $cm^3$ of air through one square inch of the film is a measure of permeability.

By determining the air permeability at different locations on the uncoated film surface the mean air flow permeability of the film is identified.

The coated film is then subjected to the same analysis and the deviation from the mean air flow value of the uncoated film is determined and expressed as a percentage of this value. Thus, the coating of the barrier material on the microporous substrate is considered to be within the acceptable limits of uniformity when the Gurley flow exhibited thereby is not greater than about ±25%, preferably not greater than about ±15%, and most preferably not greater than about ±10% of the mean Gurley value of the uncoated microporous substrate membrane.

The uncoated microporous membranes described herein will generally exhibit a mean Gurley value of from about 10 to about 60 seconds, preferably from about 12 to about 50 seconds, and most preferably from about 5 to about 40 seconds.

As the thickness of the barrier coating on the microporous films is decreased it becomes more difficult to achieve a uniform coating. For example, commonly used electroless plating methods achieve adequate uniformity when the deposited coating is relatively thick in the range of about 2000 Å. However, when a thickness of less than about 500 Å is desired such short residence times in the electroless bath are required that the uniformity of the coating is considerably reduced. In any event, any method which achieves the desired uniformity of the coating can be employed to achieve the deposit of the barrier material on the substrate membrane.

The thickness of the barrier material coating is also a property of considerable importance in the present invention. The particular thickness of the barrier material is dictated and controlled by the balance of properties of electrical resistance and resistance to zinc penetration sought to be imparted to the coated membrane.

For example, the maximum thickness of the coating on the microporous substrate which is acceptable when the same is employed as a battery separator is in part a function of the maximum permissible electrical resistance which the coated substrate can exhibit and still achieve a functional battery when employed as a separator therein. The minimum thickness of the barrier material coating which can be tolerated is a function of the minimum dendrite barrier properties sought to be imparted thereto.

When the microporous coated substrate membrane is employed as a battery separator the electrical resistance thereof is typically controlled to be not greater than about 75 milliohms-$in^2$, preferably not greater than about 50 milliohms-$in^2$, and most preferably not greater than about 15 milliohms-$in^2$.

The above electrical resistance represents only a slight increase over the electrical resistance of the uncoated microporous substrate membrane which indicates that the mass transport properties of the latter are not seriously diminished by the coating.

The resistance of the coated microporous substrate to zinc dendrite penetration can be characterized in terms of a zinc penetration factor which is defined in further detail hereinafter. Thus, when the microporous coated substrate is employed as a battery separator the thickness of the coating thereon when consisting solely of a film of the barrier material is controlled in a manner sufficient to achieve a zinc penetration factor of typically greater than about 1, preferably greater than about 1.2, and most preferably greater than about 1.5.

Accordingly, it has been found that in order to achieve the proper balance between electrical resistance and zinc penetration the total thickness of the coating on the microporous substrate is typically controlled to be not less than about 50 Å, typically from about 100 to about 750 Å, (e.g., 100 to 500 Å) preferably from about 150 to about 400 Å, and most preferably from about 200 to about 300 Å. By "total thickness" it is meant the sum of the thicknesses of each coating on each surface of the substrate membrane employed as the battery separator. For example, a coating on one surface of the membrane of 500 Å limits the coating thickness on the other side of the membrane to about 250 Å.

The porous coating of the barrier material when deposited must cover an area which is substantially coextensive with the surface of the microporous substrate membrane on which it is applied except for the interiors of the surface pores. Otherwise, the uncoated portions of the membrane will be subject to penetration by the zinc dendrites.

In order for the coated microporous substrate to function as a battery separator it must be wetted by the cell electrolyte which is dissolved in an aqueous solution. Consequently, the coated microporous substrate membrane which is normally hydrophobic is preferably rendered hydrophilic. This can be achieved by impregnating or coating the microporous substrate membrane coated with the barrier material with a suitable surfactant.

As used herein the term "hydrophobic" is defined as meaning a surface which passes less than about 0.010 milliliter of water per minute per sq. cc. of flat film surface under a water pressure of 100 psi. Likewise the term "hydrophilic" is meant to be applied to those surfaces which pass greater than about 0.01 milliliter of water per minute per sq. cc at the same pressure.

Any surfactant which when applied to the microporous substrate lowers the surface tension thereof to the extent that the substrate will exhibit a contact angle with water of less than about 80°, preferably less than about 60°, and is compatible with the coated microporous substrate membrane will render said substrate hydrophilic and can be employed to assure complete wetting.

Representative examples of suitable preferred surfactants include silicon glycol copolymers, such as polyoxyethylene polymethyl siloxane, either alone or in combination with an imidazoline tertiary amine as described in U.S. Pat. No. 3,929,509 the disclosure of which is herein incorporated by reference. Other suitable preferred surfactants include phosphate esters such as ethoxylated 2-ethylhexyl phosphate. Also included are any of the hydrophilic organic hydrocarbon monomers disclosed in U.S. Patent Application Ser. No. 071,644, filed Sept. 4, 1979 entitled "Hydrophilic Monomer Treated Microporous Film" by Nelson Lazear such as acrylic acid, methacrylic acid, vinyl acetate and mixtures thereof, which are chemically fixed within the microporous substrate membrane in accordance with the procedures described therein. The disclosure of this application is herein incorporated by reference. Further suitable surfactants include those described in U.S. Pat. No. 3,472,700 and Canadian Pat. No. 981,991 the disclosure of which is herein incorporated by reference.

While it is preferred that the microporous substrate be rendered immediately wettable for commerical reasons, it is sufficient for purposes of operability if it eventually wets upon contact with the aqueous alkaline electrolyte solution. Moreover, while it is preferred to employ a non-fugative surfactant which is not leached out of the microporous substrate during its operation in a battery, fugative surfactants may also be employed since a microporous substrate will entrap the electrolyte, by capillary action, once wetted thereby, which electrolyte can itself act as a surfactant.

It is preferred to render the microporous substrate membrane hydrophilic after the barrier material coating has been deposited thereon since some of the surfactant may be lost during the barrier coating procedure through evaporation, solvent leaching, and the like. However, in those instances where there is no danger of loss of surfactant, as where the same has been permanently fixed within the substrate, the substrate membrane may be rendered hydrophilic prior to coating.

The quantity of surfactant coated on or impregnated in the microporous substrate membrane will vary depending on the identity of the surfactant but any effective amount sufficient to render the substrate membrane hydrophilic will suffice.

Any method known in the art for applying the surfactant to the microporous substrate membrane can be employed as described in U.S. Pat. No. 3,929,509. Simply passing the microporous substrate membrane through a solution of the surfactant is the preferred method for rendering the same hydrophilic.

In an alternative embodiment the low hydrogen overpotential material (i.e., barrier material) can be applied to the surface of the microporous substrate as a suspension or slurry of the same in finely divided form, such as a powder, preferably flake and the like, in a solution of a film forming polymer which polymer exhibits the ability to absorb water and swell in an alkaline environment such as an aqueous solution of sodium or potassium hydroxide which lacquer solution also preferably contains a suitable surfactant. The film forming polymer serves as a matrix for the barrier material when applied as a coating to the surface of the microporous membrane.

The configuration of the barrier material is preferably such that 95% thereof can pass through a sieve having a screen mesh size designated according to ASTM E-11-61 of from about 325 to about 100, and preferably from about 325 to about 230.

Representative examples of such suitable film forming matrix polymers include cellulosics such as cellulose acetate, cellulose esters, cellulose ethers; polyvinyl alcohol; acrylic esters such as polymethyl methacrylate; polyvinyl pyrrolidone and derivatives thereof, polybenzimidazole; polysulfones and derivatives thereof and the like.

The preferred alkaline water swellable matrix polymer is cellulose acetate.

The matrix polymer, such as cellulose acetate, is mixed with the low hydrogen over-potential barrier material in a suitable solvent and preferably with a suitable surfactant. The weight ratio of the barrier material to the matrix polymer can vary from about 1:1 to about 4:1, preferably from about 3:1 to about 1.5:1, and most preferably from about 2:1 to about 1.75:1.

The resulting lacquer solution is then coated on the surface of the microporous substrate membrane using any suitable coating means such as roll coating, reverse roll coating, coating by means of wire wound rods and the like. Upon drying of the coating, a dense thin porous layer of the barrier material is produced on the surface of the microporous substrate.

Suitable solvents for combining the matrix polymer, barrier material, and surfactant include ketones such as acetone, methylethylketone and ethers such as ethylene glycol monomethyl ether also known as methyl "Cellosolve" TM. In short, any solvent which dissolves the matrix polymer and will not adversely affect the microporous membrane when applied to the surface thereof may be employed.

Suitable surfactants employed in the lacquer coating preferably are at least partially compatible with the matrix polymer and serve to enhance the water absorbtive properties of the coating layer and eventually render the microporous membrane hydrophilic. Representative examples of suitable surfactants include any of the aforenoted surfactants. The preferred surfactants include ethoxylated 2-ethyl-hexyl phosphate, silicon glycol copolymers and mixtures of silicone glycol copolymers with an imidazoline tertiary amine.

The surfactant which is mixed with the matrix polymer-barrier material lacquer serves two important functions, namely, it facilitates adsorbtion of the alkaline electrolyte by the coating deposited on the microporous membrane, and when the solvent evaporates through the substrate membrane the surfactant is carried along therewith and renders the same hydrophilic. Thus, when a surfactant is not employed in the lacquer coating and the microporous membrane is subsequently rendered hydrophilic as described herein, care must be taken to avoid using a solvent for the surfactant which would adversely affect the lacquer coating. Alternatively, when the surfactant is absent from the lacquer coating the microporous membrane can be rendered hydrophilic prior to applying the coating thereto.

It is to be understood that the use of a matrix polymer barrier material lacquer coating composition is not restricted to those solubilized or dispersed in volatile organic solvents. Aqueous, dispersions of the matrix polymer, barrier material, and surfactant may also be employed as the vehicle from which the coating is laid down on the surface of the microporous substrate.

The thickness of the lacquer coating of matrix polymer and barrier material is again governed by the aforedescribed desire to preserve as much as possible the low initial electrical resistance of the uncoated microporous substrate membrane and at the same time impart a high zinc penetration factor to the coated substrate when the same is employed as a battery separator.

The total thickness (as defined herein) of the matrix polymer barrier material lacquer coating is controlled to be from about 1 to about 15 microns, preferably from about 1 to about 10 microns, and most preferably from about 2 to about 5 microns.

In order to achieve a high enough density of the barrier material sufficient to reduce zinc penetration as described herein at the coating thicknesses described above, the amount of nickel deposited on the film surface should be sufficient to achieve an add-on of from about 0.2 to about 5 gm/ft$^2$, preferably from about 0.3 to about 2 gm/ft$^2$, and most preferably from about 0.5 to about 1.5 gm/ft$^2$ of substrate membrane surface area.

The embodiment employing the matrix polymer unexpectedly provides improved adhesion of the nickel to the substrate membrane. While it is known that polymers such as cellulose acetate degrade in an alkaline environment, it has unexpectedly been found that such degradation does not occur to the extent that the barrier material embedded therein does not flake off and loose its ability to stop or reduce dendrite pentration of the microporous membrane on which it is deposited. Moreover, the matrix polymer coating, while plugging the surface pores of the microporous film to the extent that no Gurley air flow is detected, does not adversely affect the electrical resistance of the coated microporous substrate membrane. In fact the matrix polymer-barrier material coating can actually reduce the electrical resistance of the uncoated microporous film. While not wishing to be bound by any particular theory it is believed that the matrix polymer, such as cellulose acetate, swells and absorbs the electrolyte creating a coating which is rich in hydroxyl ions. In the case of cellulose acetate and other ester containing polymers the ester groups hydrolyze to further increase the hydrophilicity of the coating by forming hydroxyl groups in the film coating. The high hydroxyl ion and/or group content of the membrane coating apparently facilitates the transport of the electrolyte ions through the microporous substrate membrane.

The ability of the above described coated microporous substrate membranes to achieve an acceptable balance between electrical resistance and the zinc penetration factor renders them particularly suitable for use as battery separators in any zinc electrode containing secondary battery. When employed for this purpose the number of coating layers and their arrangement on the microporous substrate membrane can vary and is governed by the needs of the battery in terms of its performance. Thus, using a microporous film as an example of a suitable substrate, the film may have the barrier coating on one or both sides thereof. Alternatively, two microporous films having a single barrier coating on one side of each film may be arranged together with the coated film surfaces facing each other. This same type of arrangement can be achieved by folding a single microporous film which is coated on only one side thereof so that the coated surfaces of each half of the fold face each other.

Regardless of the arrangement of the coated microporous substrate membrane, each surface thereof which has a barrier coating thereon must be electrically insulated from the working electrodes of the cell. The proper insulation is achieved by assuring that the coated surface of the microporous substrate is never directly exposed to an unobstructed electrically conductive path to either of the electrodes of the battery. For example when the microporous substrate is a film coated on both sides with the barrier material, said coated film will preferably be sandwiched between two uncoated non-oxidizable and non-degradeable microporous films.

Alternatively, when a microporous film is coated on only one side with the barrier material and folded so that the two coated surfaces of the fold face each other the uncoated back side surface of the film provides the necessary insulation although additional insulation in the form of uncoated microporous films can be employed.

The insulated coated microporous substrate membrane can be further positioned between electrolyte absorbent layers in accordance with well known techniques in the battery art.

The zinc anode batteries in which the above described coated microporous substrates can be employed as separators can utilize any of the conventional positive electrodes suitable for alkaline electrolytes including mercury oxide, manganese oxide, silver oxide, and preferably nickel oxide.

Suitable alkaline electrolytes which are employed in conjunction with such electodes include aqueous solutions of potassium hydroxide, lithium hydroxide, sodium hydroxide and mixtures thereof at concentrations of from about 20 to about 45%, by weight, based on the weight of the solution.

In addition to being employed as a battery separator, microporous substrate membranes coated with electrically conductive low hydrogen over-potential metals can in some instances also be employed as auxiliary electrodes or as the cathode or anode of a battery depending on the identity of the metal chosen although the requirements specified herein for said coated membranes are specifically chosen to provide functional battery separators.

The above described coated microporous substrate membranes offer a unique set of advantages which heretofore have been unachieveable in the prior art. Such coated substrate membranes are extremely compact and much thinner than the metal coated screens, non-woven and woven cloths, nettings and perforated plates of the prior art. Consequently, the power to weight ratio of batteries employing the subject coated membranes can be increased substantially since many more cells can be constructed in a given area.

Moreover, because of the thinness of the coated membranes and their low electrical resistance, the use of the same as a battery separator reduces the internal resistance of the cell compared to other known thicker battery separators thereby increasing the cell's efficiency, and capacity. In addition the coated microporous substrate membranes described herein are non-degradeable to the extent their operability is maintained for the life of the cell, flexible, posses good mechanical properties, and are extremely cost efficient to manufacture, as well as extremely efficient in their operation. They can withstand repeated charge-discharge cycling without catastrophic shorting or gradual loss of power, and result in a cell which is extremely resistant to shape change.

The following Examples are given as an illustration of the claimed invention. It should be understood, however, that the invention is not limited to the specific details set forth in the Examples. All parts and percentages in the Examples as well as in the remainder of the specification are by weight unless otherwise specified.

EXAMPLE 1

PART A

Crystalline polypropylene having a melt flow index of about 5.0 and a density of 0.905 gm/cc is melt extruded at a temperature of about 230° C. through a 12 inch diameter blown film die. The film is inflated to provide a blow-up ratio, or $D_2/D_1$ ratio, of 1.1. The film is then taken up at a drawn down ratio of 75:1. The non-porous precursor film produced in this fashion is found to have the following properties: thickness, about 1 mil (0.001 inch); recovery from 50% elongation at 25° C., 90.5%; crystallinity, 68.8%.

A sample of this film is oven annealed with air with a slight tension at 145° C. for about 23 minutes, removed from the oven and allowed to cool.

The sample of the annealed elastic precursor film is then subjected to cold stretching and hot stretching at an extension ratio of 0.8, i.e., 20% cold 80% hot, and thereafter heat set under tension, i.e., at constant length, at 145° C. for 10 minutes in air. The cold stretching portion is conducted at 25° C., the hot stretching portion is conducted at 145° C., and total draw is 100%, based on the original length of the elastic film. The resulting film has an open-celled pore structure as defined herein, an effective pore size of about 400 Angstroms, a porosity of 45%, a crystallinity of about 59.6%, and a thickness of 1 mil. Several film samples are prepared as described above and each is designated Film A.

PART B

The procedure of example 1 is repeated with the exception that the melt flow index of the polypropylene is about 0.7. The resulting microporous film exhibits a porosity of 38%, an effective pore size of 200 Å and a thickness of 1 mil. Several film samples are prepared and each is designated Film B.

PART C

Microporous film samples prepared in accordance with Part A are employed as a substrate for the deposition of a non-woven felt embossed layer.

Accordingly, polypropylene of the type employed to prepare the microporous film substrate is spray spun at a melt temperature of 350° C. through a 0.016 inch diameter nozzle, using jets of steam superheated to 405° C. and at 21 psi to attenuate the melt stream of polymer into a continuous filamentary material characterized by a dernier per filament ranging from about 1 to about 4. The filamentary material is collected on a revolving drum having a smooth metal surface spaced from the extrusion orifice at a distance of about 2 feet. The drum is rotated at a speed and for a time sufficient to produce a non-woven web weighing about 0.5 oz. per square yard. The resulting non-woven web is then laminated to samples of Film A using an embossing roll heated to a temperature of about 120° C.

The resulting felt coated embossed film has a thickness of about 4 mils. These film samples are designated Film C.

PART D

Several samples of Film A are metallized by depositing 99.99% nickel thereon using a Sloan Deposition Controller model DDC-1000, available from Sloan Technology, Santa Barbara, Calif., equipped with a 270° angle rf diode electron beam gun which is housed in a fully automated bell jar.

Deposition is conducted for a time and at a rate sufficient to achieve nickel coatings of various thickness as shown at Table 1, runs 2 to 14.

The resulting nickel coated films are then rendered hydrophilic in accordance with the procedures described hereinafter in Part E.

PART E

Several samples of Film A are coated with 99.99% pure nickel by placing them in a 25 inch rotary planetary fixture which is in turn mounted in a rf diode sputtering module, model-3120 available from Varian Associates, equipped with an S-Gun source cathode. The base pressure in the vacuum chamber is reduced to $6 \times 10^{-7}$ Torr. The vacuum chamber is then backfilled with argon to a pressure of 3 millitorr. An rf power of about 2 killowatts is applied to the cathode and the plasma discharge is ignited. The cathode self biases to a negative dc voltage of 400 volts and current of 5 amps. Deposition is conducted for a time and at a rate sufficient to achieve nickel coatings of various thicknesses as shown at Table 1, runs 15 and 16. The samples of Film A are coated only on one side of the microporous film.

The resulting coated film samples are made hydrophilic by immersing them in a solution of acetone containing 6%, by weight, Victawet 12 TM surfactant available from Stauffer Chemical Co. which is ethoxylated 2-ethyl hexyl phosphate, and the solvent is allowed to evaporate. The dried nickel coated film samples contain an add-on of surfactant of about 15% by weight based on the weight of the film prior to treatment with the surfactant solution.

PART F

Several film samples prepared in accordance with Part C are metallized in accordance with the procedures of Part D and rendered hydrophilic in accordance with Part E. The thickness of the metal coating is shown at Table 1, runs 12–14.

PART G

The surface of the Film B samples is rendered hydrophilic in the same manner as described in Part E of this example.

PART H

Hydrophilic nickel coated film samples prepared in accordance with Parts D, E, and F are tested for their zinc penetration factor. This is accomplished by preparing several separator systems with each comprising at least one of the hydrophilic nickel coated film samples prepared as described herein sandwiched between two of the film samples prepared in accordance with Part G (i.e., hydrophilic film B). Thus, each separator system comprises one or more hydrophilic porous nickel coated microporous films characterized by a variety of different arrangements and nickel coating thickness sandwiched between two non-metallized hydrophilic microporous films. The inner films having the nickel coating deposited thereon are designated the barrier layers.

Each separator system is then placed in a zinc penetration test cell.

The design of the zinc penetration test cell is shown in FIGS. 1 and 2. FIG. 1 depicts a side cross-sectional view along line A of FIG. 2. FIG. 2 depicts a top view looking down into the cell with its cover removed. With reference to the drawings four BB-461 silver-zinc ABS monoblock cell cases (12) are used to house the cell componentry. The inner cell dimensions are $0.730'' \pm 0.005''$ wide, $2\frac{1}{4}''$ long and 3-3/16" high. The cell components include (a) 0.005" thick pure sheet zinc cathode (1), $2\frac{1}{2}''$ high $\times 1\frac{1}{4}''$ wide clad as a "U" around a 0.005" sheet nickel current collector (2), 4" high (including a $1\frac{1}{2}''$ high $\times \frac{1}{4}''$ wide tab (2')) and $1\frac{3}{4}''$ wide, (b) four layers (depicted as one) of 0.005" thick corroding sheet zinc anode (3) folded in a "U", $2\frac{1}{2}''$ high $\times 1\frac{1}{2}''$ wide and a sheet nickel current collector (4) 4" high (including $1\frac{1}{2}'' \times \frac{1}{4}''$ tab (4')) and $1\frac{1}{2}''$ wide, (c) a partially charged $Ni(OH)_2$ reference electrode (5), 0.028" thick, $1\frac{1}{4}''$ high and $1\frac{1}{4}''$ wide, juxtaposed against the sheet zince cathode (1), (d) 0.005" thick polyamide felt Pellon (6) cladding the sheet zinc cathode (1), (e) a "U" wrapped separator system (shown as the test separator system 7/8/7) enveloping said $Ni(OH)_2$ reference electrode (5) with the empty half of separator "U" being folded to the rear of the reference electrode and facing the corroding sheet zinc anode (3), (f) two lucite supporting blocks (9) and (9'), each 0.25" thick, $2\frac{1}{4}''$ wide and $2\frac{1}{4}''$ high, located between the corroding sheet zinc anode (3) and reference electrode (5) containing $\frac{7}{8}''$ diameter electrolyte channels, centrally located, and (g) lucite shims (10), located at the rear of the corroding anode. It is separator (8) which is varied as described herein.

The internal cell pack pressure is kept in a range of 1 to 3 psi by means of shimming (14) the wet electrode pack to the same thickness as the unit cell clearance, i.e., $0.730'' \pm 0.005''$. Other features of the cell design include: (a) a heat-sealed 0.002" polyethylene bag (11) which contains the sheet zinc cathode (1) plus nickel collector (2) and has a 1.0" diameter opening port that lines up with the open electrolyte channel of the supporting blocks, (b) an ABS cover (13), (c) voltage recorders (not shown) to monitor the potentials between the zinc cathode and reference electrode, and the zinc cathode and zinc anode and (d) the necessary circuitry to overcharge the sheet zinc cathode versus the corroding zinc anode (also not shown).

After each separator system is in place 20 cc of 42% KOH solution saturated with zincate is added to each cell. Entrapped air is removed from the cells by applying a partial vacuum thereto of 15 in.Hg for 2 to 3 minutes. The electrolyte height is adjusted to 2 inches and the cells are allowed to soak in an air tight chamber 2 to 3 days to prevent carbonation. The fully discharged $Ni(OH)_2$ reference electrodes (5) are charged at 100 milliamps (mA) for 3 minutes versus the sheet zinc cathode (1) which receives an imput of 0.005 ampere hours (Ah).

The sheet zinc cathode (1) is overcharged versus the corroding sheet zinc anode (3) at 60 mA (100 $mA/in^2$), while recording on graph paper the potential between the zinc cathode (1) and zinc anode (3) on the 500 millivolt scale and that between the zinc cathode (1) and nickel hydroxide electrode (5) on the five volt scale.

The time to short, as seen by a 200–500 millivolt drop, on the zinc to zinc potential chart is noted. On the zinc to $Ni(OH)_2$ potential chart, a partial short is manifested as a very small dip in potential while a massive or "dead" short is manifested as a 1.0 to 1.5 volt drop. In those instances where a separator system is totally resistant to zinc penetration shorts, there will be no potential drops recorded on either the zinc to zinc or zinc to $Ni(OH)_2$ curves. In this case the test is discontinued after 5 to 7 days.

The ampere hours to short as determined from the zinc to zinc potential chart is calculated and divided by the total wet thickness of the separator system to attain ampere hours to short per mil of test separator.

The zinc penetration factor of the test separator is then determined by dividing the ampere hours to short-/mil of test separator by that obtained from a single-layered cellophane control i.e., 0.152.

The results are summarized at Table 1 for each separator.

As may be seen from the data of Table 1, runs 1 to 7 illustrate the effect of using a single layer nickel coating on a hydrophilic microporous film having an average pore size of about 400 Å which is sandwiched between two non-metallized hydrophilic films. The thickness of the nickel coating varies from 50 to 500 Å. The two non-metallized hydrophilic films prevent local action between the zinc anode and nickel coating on the barrier layer for all runs. The zinc penetration time and hence the zinc penetration factor increases linearly with increased thickness of the film up to 500 Å. Failure in all cases is believed to be due to shedding and flaking of the nickel from the microporous film, particularly at the folds of the separator and at the edges of the electrolyte channel of the supporting lucite block which presses against the folded separator.

Runs 7 to 9 which employ hydrophilic microporous films coated on both sides with nickel layers of varying thickness. The relationship between the thickness of the film and the ampere hours to short is also linear between 100 and 2000 Å (i.e., run 9 with 1000 Å on each side) but the zinc penetration factor increases substantially compared to runs 1 to 6. As with the single layered test failure is due to nickel shedding which occurs to a lesser extent.

Runs, 10 and 11 illustrate a barrier layer wherein two single nickel layered coatings on two different films are arranged with the nickel layers face to face (run 10) and then with the non-metallized film surfaces being face to face (run 11). This arrangement is commercially more desirable because it is much cheaper to coat the microporous film on one surface rather than two.

For run 10, the zinc penetration factor is 1.69 as compared to 1.43 for the single 500 Å nickel coated sample of run 6 and about 1.88 for the sample of run 8 coated with 250 Å of nickel on each face. Nickel shedding again limited the life of the test cell.

Runs 12 to 14 illustrate the effect of employing a microporous film having a 3 mil layer of non-woven polypropylene fibers embossed thereon. Run 12 which employs a 200 Å nickel coating on the felted side shows a substantial improvement in the zinc penetration factor to 2.02 as compared to 0.71 for run 4 which employs a 200 Å coating on a non-felted film. Run 13 also shows a substantial improvement in the zinc penetration factor when compared to run 4. Part of the improvement is believed to be due to the buttressing effect of the felt fibers which improve the adhesion of the nickel coating to the film and to the embossed ridges which provide gas channels for liberating the hydrogen generated by the dissolution of the zinc dendrites. Some nickel shedding was still observed although it was substantially reduced. Run 14 which employs a nickel coating on the non-felted side of the film also shows a substantial improvement in the zinc penetration factor to 1.56 as compared to 0.71 for run 4. This improvement is believed to be due to the embossing effect and the gas path effect of the channels produced thereby for release of hydrogen.

Runs 15 and 16 employ films having nickel coatings deposited by the Varian S-Gun which apparently achieved better adhesion of the nickel coating to the film since substantially less nickel flaking was observed. The zinc penetration factor of these runs both showed improvements over run 4.

With regard to the electrical resistances of the separator systems it can be seen that only a slight increase thereof occurs over the non-metallized system of run 1 up to a nickel coating thickness of 500 Å. However, the nickel coating of run 9 which has a thickness of 1000 Å on each side increases the electrical resistance substantially up to 200 milliohms-in$^2$. Such a high electrical resistance would substantially reduce the power output of a battery employing such a battery separator.

It is to be understood that the conditions employed for the above zinc penetration tests are intended to simulate the internal cell environment of an actual nickel-zinc battery but under the most severe and extreme operating conditions such as the presence of excess electrolyte, and continuous overcharging at relatively high current densities. Therefore the improvement in the zinc penetration factors noted above are significant and upon improvement in the design of the battery cell to reduce the folds to which the battery separator is subjected, nickel shedding can be eliminated and the barrier separator is expected to withstand up to 500 charge-discharge cycles under normal operating conditions.

TABLE 1

| Run No. | No. Of Films In Barrier Layer | Facing Arrangement Of Ni Coated Films In The Barrier Layer | Thickness Of Nickel Coating (Å) | Wet Mil Thickness Of Barrier Separator System (mils) | Average E.R. Of Barrier Separator System (milliohms-in$^2$) | Ampere Hours To Short | Ampere Hours Per Mil Of Separator System | Zinc Penetration Factor |
|---|---|---|---|---|---|---|---|---|
| 1 | 1 | NA | 0 | 3.0 | 10 | 0.024 | 0.008 | 0.050 |
| 2 | 1 | Ni-F | 50 | 3.0 | 11 | 0.072 | 0.024 | 0.16 |
| 3 | 1 | Ni-F | 100 | 3.0 | 12 | 0.100 | 0.033 | 0.22 |
| 4 | 1 | Ni-F | 200 | 3.0 | 11 | 0.320 | 0.107 | 0.71 |
| 5 | 1 | Ni-F | 250 | 3.0 | 11 | 0.340 | 0.113 | 0.75 |
| 6 | 1 | Ni-F | 500 | 3.0 | 12 | 0.655 | 0.218 | 1.43 |
| 7 | 1 | Ni-F-Ni | 100 each | 3.0 | 12 | 0.667 | 0.222 | 1.46 |
| 8 | 1 | Ni-F-Ni | 250 each | 3.0 | 17 | 0.855 | 0.285 | 1.88 |
| 9 | 1 | Ni-F-Ni | 1000 each | 3.0 | 200 | 1.835 | 0.612 | 4.03 |
| 10 | 2 | F-Ni, Ni-F | 250 and 200 | 4.0 | 12 | 1.025 | 0.256 | 1.69 |
| 11 | 2 | Ni-F, F-Ni | 250 and 200 | 4.0 | 12 | 0.922 | 0.231 | 1.52 |
| 12 | 1 | F-Ni$_f$ | 200 | 6.0 | 12 | 1.820 | 0.307 | 2.02 |
| 13 | 1 | Ni$_f$F | 200 | 6.0 | 12 | 1.760 | 0.287 | 1.89 |

TABLE 1-continued

| Run No. | No. Of Films In Barrier Layer | Facing Arrangement Of Ni Coated Films In The Barrier Layer | Thickness Of Nickel Coating (Å) | Wet Mil Thickness Of Barrier Separator System (mils) | Average E.R. Of Barrier Separator System (milliohms-in²) | Ampere Hours To Short | Ampere Hours Per Mil Of Separator System | Zinc Penetration Factor |
|---|---|---|---|---|---|---|---|---|
| 14 | 1 | Ni-F$_f$ | 200 | 6.0 | 15 | 1.420 | 0.237 | 1.56 |
| 15 | 1 | Ni-F | 200 | 3.0 | 6 | 0.470 | 0.157 | 1.03 |
| 16 | 1 | F-NI | 200 | 3.0 | 6 | 0.415 | 0.139 | 0.92 |

Ni-F = Film coated on one side with nickel and the nickel coating faces the Zn cathode.
F-Ni = Film coated on one side with nickel and the nickel coating faces the reference electrode.
Ni-F-Ni = Both sides of a single film are coated with nickel.
F-Ni, Ni-F = Two films each coated on one side with nickel having the nickel coatings face to face with the uncoated film surfaces facing the electrodes.
Ni-F, F-Ni = Two films each coated on one side with nickel having the uncoated surfaces face to face.
F-Ni$_f$ = Embossed non-woven felt film laminate of Part C coated on the felt side with nickel, nickel layer faces the reference electrode.
Ni-F$_f$ = Embossed non-woven felt film laminate of Part C coated with nickel on the non-felted film side, nickel layer faces Zn cathode.

EXAMPLE 2

Several microporous samples of Films A, B and C prepared in accordance with Example 1, parts A, B, and C are employed as substrate membranes and metallized with nickel in accordance with Example 1, parts D and E as shown at Table 2. The thickness of each nickel coating is varied as is the facing arrangement as shown at Table 2. The resulting metal coated films are then rendered hydrophilic as described in part E of Example 2 and tested for electrical resistance using a 40% by weight solution of KOH as described herein. Samples of the films are also tested for the uniformity of the coating by measuring the mean Gurley values of the non-metallized and corresponding metallized films and the % deviation from the mean attributable to the coating is determined as shown at Table 2.

As may be seen from the data of Table 2, both the electrical resistance of, and the uniformity of the coating on, the microporous membrane vary within a relatively small range as long as this total thickness of the coating is within the range of about 500 Å and below. However, when the total thickness of the coating is about 2000 Å, both the electrical resistance and uniformity of the coating suffer considerably. Thus, this data conforms the criticality of the thickness of the coating in this embodiment.

acetate matrix polymer in a lacquer coating. Thus, the following components are mixed together as shown at Table 3.

TABLE 3

| Component | Parts by Wt. |
|---|---|
| Cellulose acetate | 5 |
| Victawet 12[1] | 5 |
| Nickel[2] | 10 |
| Acetone/methyl | 80 |
| "Cellosolve" TM 75/25 by vol. | 100 |

[1]Victawet 12 is a phosphoric ester surfactant as described in Example 1.
[2]Nickel is a 325-flake characterized by an average particle size distribution such that 95% thereof passes through a 325 mesh screen, a flake thickness of 0.6 micron, a density of 1.15 gm/cc, a specific gravity of 3.54 at 25° C., and an approximate bulk value of 0.034 gal/lb.

The resulting composition is applied to the surface of a sample of Film A of Part A of Example 1 using a #16 coating bar. The resulting film coating has a thickness of 0.1 mil, an average coating weight of 0.9 gm/ft² and the weight of nickel applied is 0.45 gm/ft² of film surface. The resulting coated film is dried in an oven at 175° F. and then tested for electrical resistance using a 40% solution of KOH as described herein which is found to be 4.0 milliohms-in² (average).

The zinc penetration factor of said film is estimated to be greater than about 1.0.

As may be seen from the above results while the

TABLE 2

| Run No. | Type of Film | Method Of Metal Deposition | Facing[1] Arrangement Of Nickel Coating | Thickness Of Nickel Coating (Å) | Average E.R. Of Coated Film (milliohms-in²) | Mean Gurley Value Of Uncoated Film(sec.) | Mean Gurley Value Of Coated Film(sec.) | % Deviation From The Mean |
|---|---|---|---|---|---|---|---|---|
| 1 | A | Sloan | Ni-F-Ni | 1000 each | 297 | 12 | 175 | 679 |
| 2 | B | Sloan | Ni-F | 100 | 8.4 | 40 | 44 | 5 |
| 3 | B | Sloan | Ni-F-Ni | 100 each | 7.0 | 40 | 51 | 13.8 |
| 4 | B | Sloan | Ni-F | 200 | 9.4 | 40 | 48 | 10 |
| 5 | B | Sloan | Ni-F | 50 | 3.9 | 40 | 42 | 2.5 |
| 6 | A | Sloan | Ni-F | 250 | 5.3 | 12 | 14 | 8.3 |
| 7 | A | Sloan | Ni-F-Ni | 250 each | 11.8 | 12 | 15 | 12.5 |
| 8 | A | Sloan | Ni-F | 500 | 12.8 | 12 | 13 | 4.2 |
| 9 | A | Varian | Ni-F | 340 | 6.4 | 7 | 7.9 | 6.4 |
| 10 | A | Varian | Ni-F | 280 | 15.0 | 12 | 17 | 20.8 |
| 11 | C | Varian | Ni-F$_f$ | 280 | 20.2 | 9 | 12 | 10 |
| 12 | C | Varian | Ni-F$_f$ | 280 | 9.9 | 9 | 9.8 | 4.4 |
| *13(control) | A | None | None | None | 5.0 | | | |
| *14(control) | B | None | None | None | 15.0 | | | |
| *15(control) | C | None | None | None | 12.0 | | | |

[1]For meaning of facing arrangement see Table 1.
*The control film samples are all rendered hydrophilic in accordance with Example 1 Part E.

EXAMPLE 3

This example illustrates the deposition of the nickel on the surface of a microporous film using a cellulose overall thickness of the cellulose acetate film is relatively high, the amount of nickel consumed in the coating is quite small and the electrical resistance is quite low.

It is believed that the microporous substrate is rendered hydrophilic by the absorbtion of the surfactant into the pores of the same as described herein.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. At least one open-celled microporous membrane having deposited on at least one surface thereof a uniform porous coating comprising a low hydrogen overpotential material, said microporous membrane prior to deposition of said coating being characterized by an electrical resistance when rendered hydrophilic of not greater than about 15 milliohms-in$^2$, a reduced bulk density as compared to the corresponding substrate membrane having no open-celled structure, a surface area of at least 10 square meters per gram, and an average pore size of from about 200 to about 10,000 angstroms, said porous coating covering an area which is substantially coextensive with the surface of the microporous substrate membrane on which it is deposited and being characterized by a uniform total thickness of at least 50 angstroms, yet insufficient to cause the electrical resistance of said coat of microporous membrane to exceed about 75 milliohms-in$^2$, when rendered hydrophilic, said coated microporous membrane having the ability to pass greater than about 0.01 mililiters of water per minute per square centimeter at a water pressure of 100 pounds per square inch gauge.

2. The coated microporous membrane of claim 1 wherein the membrane is an open-celled microporous film, derived from an olefinic polymer by the "dry stretch" or "solvent stretch" methods, having an average pore size of from about 200 to about 5,000 Å, and a porosity of from about 30 to about 85%, the low hydrogen over-potential material is a metal selected from the group consisting of nickel, iron, cobalt, platinum palladium, indium, chromium, manganese, titanium and alloys thereof, and the total thickness of the uniform metal coating is from about 100 to about 750 Å.

3. The coated microporous film of claim 2 wherein the microporous film is polypropylene and is prepared by the "dry stretch" method, the low hydrogen overpotential material is nickel which is deposited to a uniform thickness of from about 100 to about 500 Å and the electrical resistance of the coated microporous film is not greater than about 50 milliohms-in$^2$.

4. The coated microporous film of claim 2 wherein the coated microporous film is embossed.

5. The coated microporous film of claim 2 wherein the film upon which said coating is deposited further comprises a layer of non-woven substantially continuous randomly arranged filamentary material derived from polymers selected from the group consisting of polyolefins, cellulose acetate, polyamides, polyacetals, polyalkylene sulfides, and polyarylene oxides, of varying diameter, which filamentary material is thermally bonded to itself and to at least one surface of the film at randomly located contact points between the filamentary material and the film, which filaments extend generally parallel to the plane of the film, said layer of filamentary material being embossed on the surface of said film to achieve a thickness of from about 1 to about 10 mils, and being coextensive with the surface of the microporous film on which it is present.

6. The coated microporous film of claim 5 wherein the filamentary material is derived from a polyolefin, said filamentary layer is applied to only one surface of the microporous film, and said metal coating is present on the surface of said filamentary layer.

7. The coated microporous film of claim 6 wherein the filamentary material is polypropylene having a denier per filament of from about 0.5 to about 5 and the thickness of the filamentary layer is about 1 to about 5 mils.

8. The coated microporous membrane of any one of claims 1, 2, and 5 which further comprises a surfactant disposed on said coated microporous membrane.

9. The coated microporous membrane of claim 8 wherein the surfactant is selected from the group consisting of silicon glycol copolymers, mixtures of silicon glycol copolymers and at least one imidazoline tertiary amine, ethoxylated 2-ethyl-hexyl phosphate, vinyl acetate, acrylic acid, and methacrylic acid.

10. At least one open-celled microporous polypropylene microporous film having deposited on at least one surface thereof a uniform porous coating of nickel, said microporous film prior to the deposition of said nickel coating being characterized by an electrical resistance of not greater than about 15 milliohms-in$^2$ when rendered hydrophilic, a reduced bulk density as compared to the corresponding film having no open-celled structure, a surface area of at least 10 square meters per gram, an average pore size from about 200 to about 10,000 angstroms, a crystallinity of at least 30 percent, and a porosity of from about 35 to about 45 percent, said porous nickel coating covering an area which is substantially coextensive with the surface of the microporous film on which it is deposited and having a uniform total thickness of from about 200 to about 300 angstroms, said nickel coated microporous film having the ability to pass greater than about 0.01 mililiters of water per minute per square centimeter at a water pressure of 100 pounds per square inch gauge.

11. At least one open-celled microporous membrane having deposited on at least one surface thereof a uniform coating, said microporous membrane prior to deposition of said coating being characterized by an electrical resistance when rendered hydrophilic of not greater than about 50 milliohms-in$^2$, a reduced bulk density as compared to the corresponding substrate membrane having no open-celled structure, a surface area of at least 10 square meters per gram, and an average pore size of from about 200 to about 10,000 angstroms, said coating comprising (1) a matrix polymer selected from the group consisting of cellulose acetate, cellulose esters, polyvinyl alcohol, polymethyl methacrylate, polyvinyl pyrrolidone, polybenzimidazole, and polysulfones, and (2) a low hydrogen over-potential material in finally divided form uniformly distributed within said matrix polymer, said low hydrogen overpotential material being present on the surface of said microporous membrane in an amount sufficient to achieve an add-on of about 0.2 to about 5 grams per square foot of microporous membrane surface, and said coating covering an area which is substantially coextensive with the surface of the microporous membrane on which it is deposited and having a total thickness of from about 1 to about 15 microns, said coated microporous membrane having the ability to pass greater than about 0.01 mililiters of water per minute per square centimeter at a water pressure of 100 pounds per square inch gauge.

12. The microporous membrane of claim 11 wherein said coating further comprises a surfactant.

13. The coated microporous membrane of claim 11 wherein the membrane is an open-celled microporous film, derived from an olefinic polymer having an average pore size of from about 200 to about 5,000 Å, and a porosity of from about 30 to about 85%, the matrix polymer is cellulose acetate, the low hydrogen over-potential material is a metal selected from the group consisting of nickel, iron, cobalt, platinum, palladium, indium, chromium, manganese, tiatanium and alloys thereof, the total thickness of said coating is from about 1 to about 10 microns, and the add-on of the low hydrogen over-potential material is from about 0.3 to about 2 gm/ft$^2$ of surface area of the microporous film.

14. The coated microporous film of claim 13 wherein said microporous film is polypropylene prepared by the "dry stretch" method, and said low hydrogen over-potential material is nickel.

15. The coated microporous film of claim 13 wherein the film upon which said coating is deposited further comprises a layer of non-woven substantially continuous randomly arranged filamentary material derived from polymers selected from the group consisting of polyolefins, cellulose acetate, polyamides, polyacetals, polyalkylene sulfides, and polyarylene oxides, of varying diameter, which filamentary material is thermally bonded to itself and to at least one surface of the film at randomly located contact points between the filamentary material and the film, which filaments extend generally parallel to the plane of the film, said layer of filamentary material being embossed on the surface of said film to achieve a thickness of from about 1 to about 10 mils, and being coextensive with the surface of the microporous film on which it is present.

16. The coated microporous film of claim 15 wherein the filamentary material is derived from a polyolefin, said filamentary layer is applied to only one surface of the microporous film, and said coating is present on the surface of said filamentary layer.

17. The coated microporous film of claim 16 wherein the filamentary material is polypropylene having a denier per filament of from about 0.5 to about 5 and the thickness of the filamentary layer is about 1 to about 5 mils.

18. In a rechargeable battery comprising at least one electrolytic cell, said cell including a zinc anode and a cathode disposed in an alkaline electrolyte, said anode and cathode being separated in said electrolyte by a battery separator the improvement comprising the battery separator comprising at least one coated open-celled hydrophilic microporous membrane of any one of claims 1 to 7, and 11 to 17

19. A process for reducing the zinc dendrite penetration of a battery separator which is disposed between a zinc anode and a cathode which consititute the electrodes of at least one rechargeable electrolytic cell employing an alkaline electrolyte and for increasing the uniformity of current density during recharging thereof which comprises employing as the battery separator at least one of the coated open-celled microporous membranes of any one of claims 1 to 7, and 11 to 17 and electrically insulating the surface of said microporous membrane having the low hydrogen over-potential material present thereon from the anode and cathode.

* * * * *